United States Patent [19]
Ginsburg

[11] 3,993,976
[45] Nov. 23, 1976

[54] METHOD AND APPARATUS FOR PATTERN ANALYSIS

[75] Inventor: Arthur P. Ginsburg, N. Billerica, Mass.

[73] Assignee: The United States of America as represented by the Secretary of the Air Force, Washington, D.C.

[22] Filed: May 13, 1974

[21] Appl. No.: 469,194

[52] U.S. Cl. .......................... 340/146.3 P; 250/550; 350/162 SF
[51] Int. Cl.$^2$ .......................................... G06K 9/00
[58] Field of Search ............... 340/146.3 P, 146.3 E; 350/162 SF, 3.5; 250/550

[56] References Cited
UNITED STATES PATENTS
3,563,634   2/1971   Parks et al. .................... 340/146.3 P OTHER PUBLICATIONS
Stromeyer III et al., "Spatial–Frequency Masking in Vision," *Journal of the Optical Society of America*, (vol. 62, No. 10), Oct. 1972, pp. 1221–1232.

Schneider et al., "Spatial Frequency Range Scanning Using a Zoom Objective," *Applied Optics*, (vol. 11, No. 8), Aug., 1972, p. 1875.

*Primary Examiner*—Leo H. Boudreau
*Attorney, Agent, or Firm*—Joseph E. Rusz; Sherman H. Goldman

[57] ABSTRACT

A technique and apparatus for two dimensional pattern analysis utilizing a transform of the pattern enables the extraction of desired pattern information by means of spatial filtering in accordance with known human visual system processing. Two dimensional spatial frequencies resulting from the transform are acted on by either anisotropic or uniquely used conventional filters to extract one, two and three dimensional pattern information from spatial frequency subsets to determine general form, edge, texture and depth information for detection, identification and classification of objects in simple or complex scenes.

3 Claims, 9 Drawing Figures

METHOD AND APPARATUS FOR PATTERN ANALYSIS

BACKGROUND OF THE INVENTION

The invention relates generally to pattern analysis and more particularly to two dimensional pattern analysis performed by attenuating and isolating spatial frequency subsets of a transform of the pattern. Transform attenuation corresponding to the variations of human contrast sensitivity over 360° orientation may be used to bias two dimensional transform data such that one, two and three dimensional pattern information in spatial frequency subsets may be extracted by using conventional bandpass spatial filters. In addition, the conventional bandpass spatial filter may provide depth information by uniquely using it in combination with the transform with or without the transform attenuation corresponding to variations of human contrast sensitivity.

The prior art has attempted similar two dimensional pattern analysis using contrast sensitivity data; however, any contrast sensitivity attenuation attempted was performed isotropically over 360°. Also, special binary valued, wedge-type filters were used to obtain spatial frequency information at various orientations. However, these devices required complex means for extracting the pattern elements to create special frequency signature rather than enabling the ulitization of simple thresholding to obtain the same result for many tasks. Basic pattern information previously required heuristic low pass bandpass spatial filters. None of the prior art devices were able to obtain large amounts of relevant pattern information from two dimensional spatial frequency information because the attenuation characteristics for orientation and spatial frequency and relevant spatial frequency bands were not recognized or determined. Furthermore, third dimensional depth information in terms of spatial frequency subsets and reconstructed intensity gradients has been beyond the realm of the two dimensional pattern analysis systems heretofore contemplated. Finally, two dimensional pattern analysis previously developed does not have the unification or parsimony of the methods outlined herein.

SUMMARY OF THE INVENTION

A method and apparatus for two dimensional pattern analysis utilizing two spatial filter types is presented. The first spatial filter type is unique and attenuates the two dimensional pattern transform data corresponding to human contrast sensitivity values. This represents the human physiological visual system asymmetric resolution of pattern information over 360° of orientation. The asymmetric spatial filter provides a great amount of pattern information since it is orientation sensitive, especially in automatically separating similar texture elements and forms from backgrounds that differ only in orientation. The attenuation characteristics of the asymmetric spatial filter automatically provides, upon reconstruction of the attenuated transform, intensity values that allow the use of simple thresholding to isolate similar pattern elements differing in orientation over a continuum of intensity values. The second spatial filter type is a conventional bandpass filter. The attenuation characteristics of the anisotropic spatial filter allows basic pattern form information to be extracted by a conventional bandpass spatial filters based upon energy of the transform components resulting in less transform information to be stored in a memory and processed for the classification scheme. Translating conventional spatial filters over the two dimensional transform to isolate spatial frequency subsets, according to energy contained therein, renders possible the extraction of three dimensional information by correlating that information with similar information stored in memory or by retransforming just the isolated spatial frequency subset. Third dimension depth information is in terms of pattern intensity with concomitant shape changes can be seen explicitly in a retransformed pattern. This technique of translated spatial filters also allows the extraction and biasing of selected original pattern edge features in the reconstructed pattern. In addition, the very low spatial frequency information, e.g., the fundamental spatial frequency also is used to extract third dimensional depth information over large pattern areas, e.g., depth information from different texture gradients.

Thus, it is the primary object of this invention to develop a method and apparatus that enables the isolation and extraction of edge, form and texture, and three dimensional (depth) information from two dimensional patterns within the context of human visual information processing.

It is an object of this invention to obtain edge information from a two dimensional display by the translation of a conventional bandpass filter over two dimensional spatial frequency subsets.

It is another of this invention to obtain shape changes and intensity gradients from a two dimensional display which are correlated to patterns in depth.

It is still another object of this invention to provide a system utilizing a two dimensional Fourier or other transform which is coupled to a spatial filter having a modulation transfer function corresponding to human contrast sensitivity values and a conventional spatial filter to get improved correlation with the human visual system processing for more accurate selection of important spatial frequencies to be extracted by the conventional bandpass spatial filters.

It is a further object of this invention to obtain edge, form, texture and depth information from a two dimensional transform which is filtered, wherein the transform and filter may be either digitally or optically generated.

It is a still further object of this invention to provide a method and apparatus for two dimensional pattern analysis which corresponds to that performed by the human visual system in that spatial filtering is made to correspond to the human physiological visual system contrast sensitivity.

Another object of this invention is to obtain a two dimensional pattern analysis which utilizes a transform of the pattern into bands from which subsets may be extracted.

Still another object of this invention involves the obtaining of form information from a two dimensional pattern with a minimal amount of spatial frequencies.

A further object of this invention involves two dimensional pattern analysis wherein a transform is obtained having the fundamental frequency utilized for intensity information relating to depth; the mid-low frequencies providing form and edge information; while the high frequencies of the transform provides fine details.

A still further object of this invention involves the provision of a modulation transfer function (MTF)

spatial filter for use with a transform of a two dimensional pattern wherein the MTF filter biases the frequencies of the transform in accordance with human contrast sensitivity with anisotropic characteristics.

It is another object of this invention to provide a two dimensional pattern analysis system whereby orientation sensitivity of a spatial filter provides edge information and specific form extraction.

It is still another object of this invention to provide two dimensional pattern transform analysis techniques. Although some similar analysis can be performed mathematically in the space domain, space domain techniques such as convolution lose space invariance (translational invariance) and analytical power for separating information.

It is a further object of this invention to provide a technique and apparatus capable of automatically detecting classifying and identifying targets contained in a two dimensional data processors such as is provided by high resolution radar imagery.

It is a still further object of this invention to provide an apparatus for pattern analysis which is easy and economical to produce comprised of conventional currently available materials that lend themselves to standard mass production manufacturing techniques.

These and other advantages, features and objects of the invention will become more apparent from the following description taken in connection with the illustrative embodiment in the accompanying drawings.

DESCRIPTION OF THE PREFERRED EMBODIMENTS

The technique and apparatus for two dimensional pattern analysis is illustrated below in conjunction with specific Figures to which reference will be made. It is contemplated that both feature extraction, detection and classification will be encompassed within the pattern recognition aspects of the invention. Since feature extraction techniques of the human visual system have been investigated, the technique and apparatus of this invention is made to correspond to the human visual system. The correspondence of the apparatus of this invention to the human visual system has been provided by allocating the processing devices of the human to specific apparatus. For example, the visual system is divided into three basic units, i.e., preprocessing, transforming and classification. The preprocessing concerns the processing of the pattern, $p(x,y)$, from the lens and retina through the primary visual cortex, which would be represented in the apparatus of this system by a two dimensional, anisotropic, spatial filter (MTF) - $H_{MTF}(u,v)$ -. The transforming step would be performed by a two dimensional Fourier transform $P(u,v)$ which operates on the preprocessed data. Classification is obtained by the selection of subsets of the Fourier transform by means of conventional bandpass spatial filter $H_{BP}(u,v)$ techniques that are correlated to stored spatial frequency subsets of patterns for detection classification or identification. The reconstructed pattern, $P_r(x,y)$, is used for further analysis and thresholding techniques.

In the foregoing paragraph $p(x,y)$ is the two dimensional intensity distribution of the pattern where $x,y$ are the space coordinates in the two dimensional pattern plane. $H_{MTF}(u,v)$ is the percent contrast sensitivity values over the two dimensional transform plane $(u,v)$.

$$P(u,v) = \sum_{x=1}^{X} \sum_{y=1}^{Y} p(x,y) \exp[-i \cdot 2\pi (\frac{xu}{X} - \frac{yv}{Y})]$$

$H_{BP}(u,v)$ is a representation of the bandpass filter where selected values of $u,v$ would be equal to one for passed or correlated spatial frequencies and all others would be equal to zero. The pattern $$p_r(x,y) = \frac{1}{XY} \sum_{u=-U}^{U} \sum_{v=-V}^{V} H_{MTF}(u,v) H_{BP}(u,v) P(u,v) \exp[i \cdot 2\pi(\frac{xu}{X} - \frac{yv}{Y})]$$

where $X = 2u + 1$; $Y = 2v + 1$ and $$\frac{2\pi xu}{X} \ \& \ \frac{2\pi yv}{Y}$$

are the spatial frequencies in cycles per unit length, comprises the reconstructed two dimensional pattern after the Fourier transform and both MTF and bandpass spatial filtering.

Figure 1:
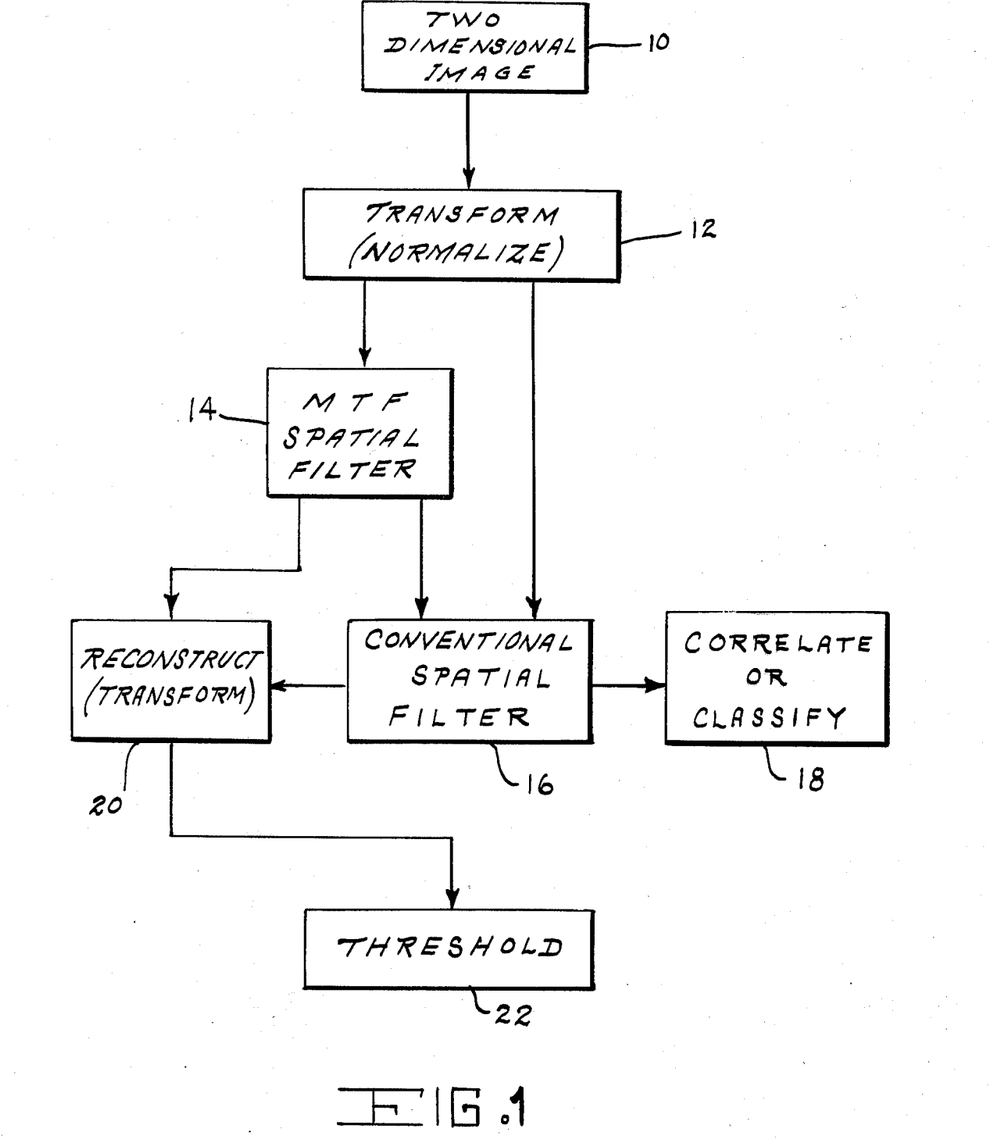
FIG. 1 is a block diagram illustrating the various steps and apparatus required for performance of two dimensional pattern analysis in order to obtain edge, texture, form and depth.

Utilization of the principles of this invention can be achieved with respect to an understnading of the block diagram of FIG. 1. In this Figure there is shown a two dimensional pattern at 10 which may be either digitally or optically presented, for example, as two dimensional radar data or a photograph. The transform at 12 results in separate frequency bands collected into frequency subsets, each of which contains specific pattern form or varieties of pattern form information. The transform may be performed by conventional optical means or by means of electronic circuitry such as a digital computer. The discussion of this invention will be related to a centro-symmetric Fourier transform since this is the easiest type to visualize and is found in the transform plane of an optical system. Other types of transform may be used and, like the two dimensional pattern, may be either optically or electronically, i.e., digitally represented. The transform 12 takes the two dimensional intensity information from the pattern at 10 and analyzes it to a multiplicity of frequency bands. The high frequency bands contains the fine detail while the low frequency bands contain gross form. When digital Fourier transforms are used, a numerical printout describes discrete frequencies whereas an optical Fourier transform provides infinite spatial frequencies.

Spatial frequency is a single value comprised of a real and an imaginary part whose magnitude $$\sqrt{(Real)^2 + (Im)^2}$$

is represented as a function of position is the u,v transform plane. The central spatial frequency D.C. represents the average energy across the pattern.

Each band increases in spatial frequency as one goes from the center of the transform (D.C.) and the same spatial frequency value is in a radially concentric pattern in an optical system or in a square shape pattern in a digital rectangular coordinate system. Collections of either one or more of the spatial frequencies in the frequency bands equally or unequally over the two dimensional transform plane are called subsets.

The MTF (Modulation Transfer Function) spatial filter is shown at 14 on FIG. 1 and is constructed so as to bias or attenuate particular frequencies at particular orientations. The attenuation is asymmetric and corresponds to the average value of (percent) contrast sensitivity for various angles in accordance with the human physiological visual system resolution. The MTF filter data ulitized in the pattern analysis of this invention relates to 0°, 45° and 90° angles with interpolation providing for values for orientations other than those obtained by measurement.

The spatial filter at 16 would be a conventional bandpass filter either isotropic or anisotropic depending upon its use as will be explained infra.

Examples of the items described relative to the diagram of FIG. 1 will be illustrated with respect to FIGS. 2–8. The two dimensional intensity pattern of the letter G formed by dots is digitally represented in FIG. 2. The blanks represent zero intensity, and digits from 1 through 9 are given their intensity value. In this and other digital representations, the value of 10 would be printed out as zero and values 0.1 to 1 would be represented as a dot.

Figure 2:
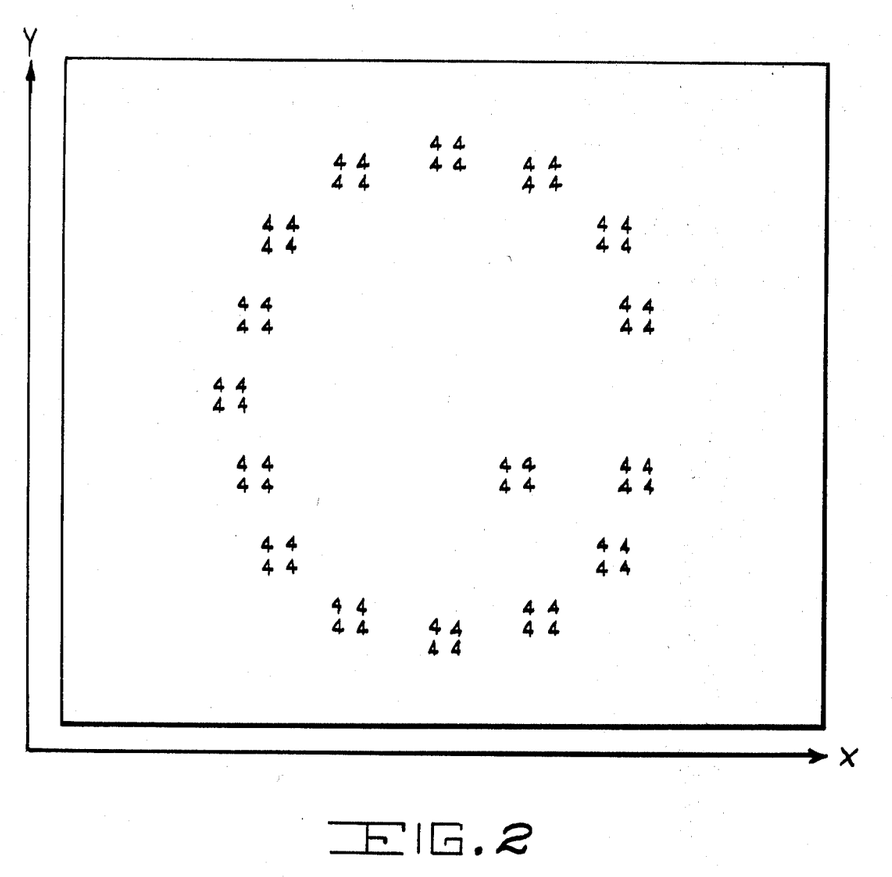
FIG. 2 is a two dimensional intensity pattern of a letter G formed by dots.
Figure 3:
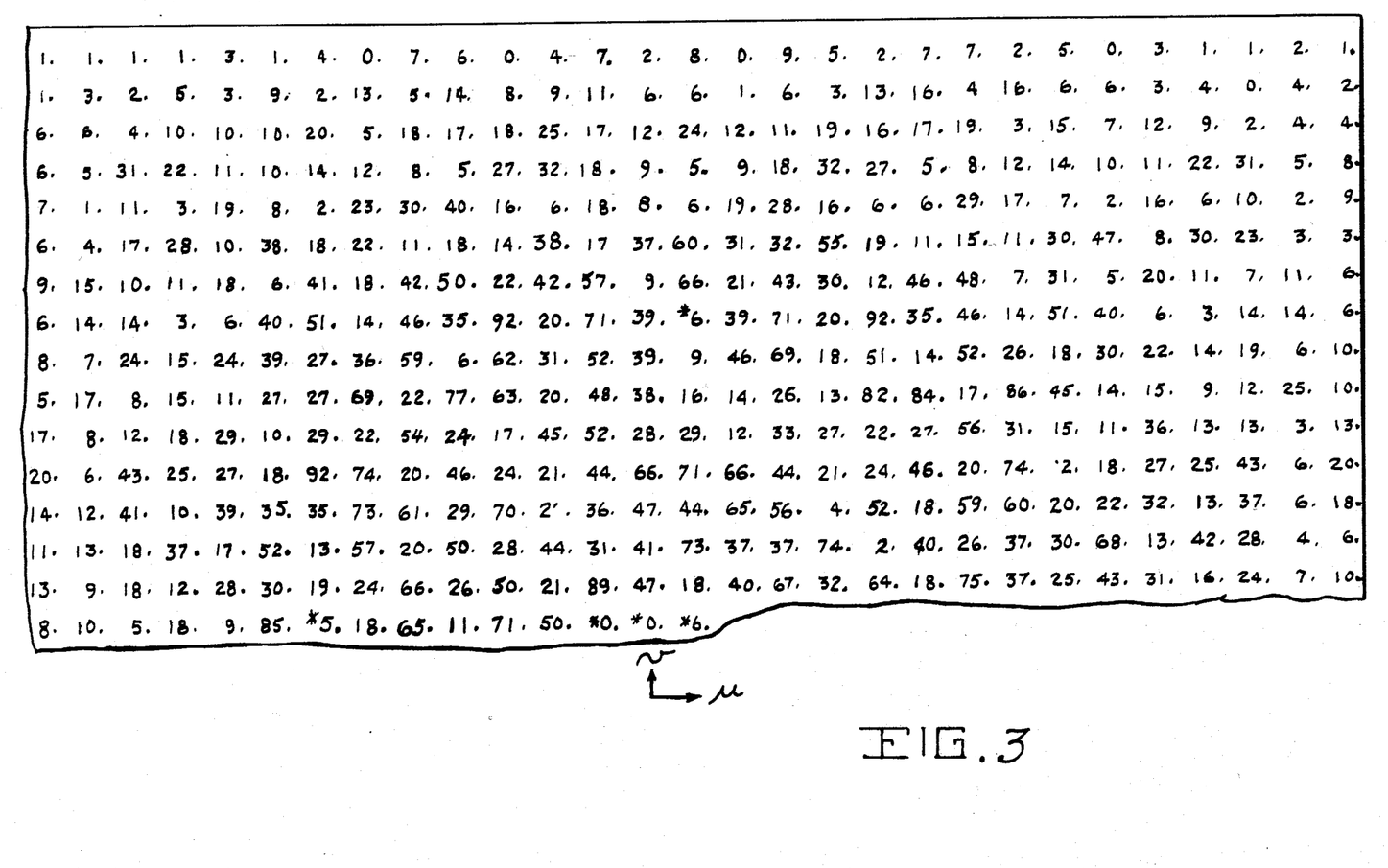
FIG. 3 is the upper half of a Fourier transform matrix representing the amplitude of the spatial frequency components in the two dimensional transform plane of the dotted letter G of FIG. 2.
Figure 4:
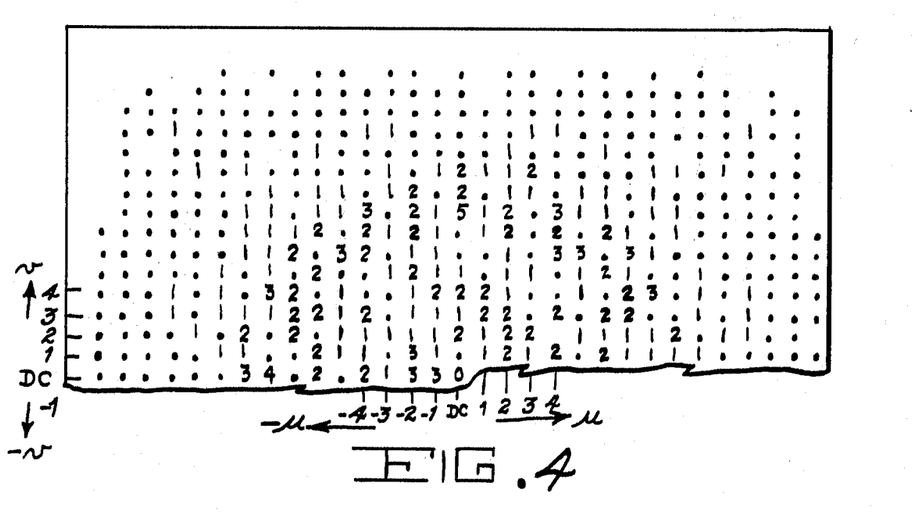
FIG. 4 is the normalized Fourier transform of FIG. 3.
Figure 5:
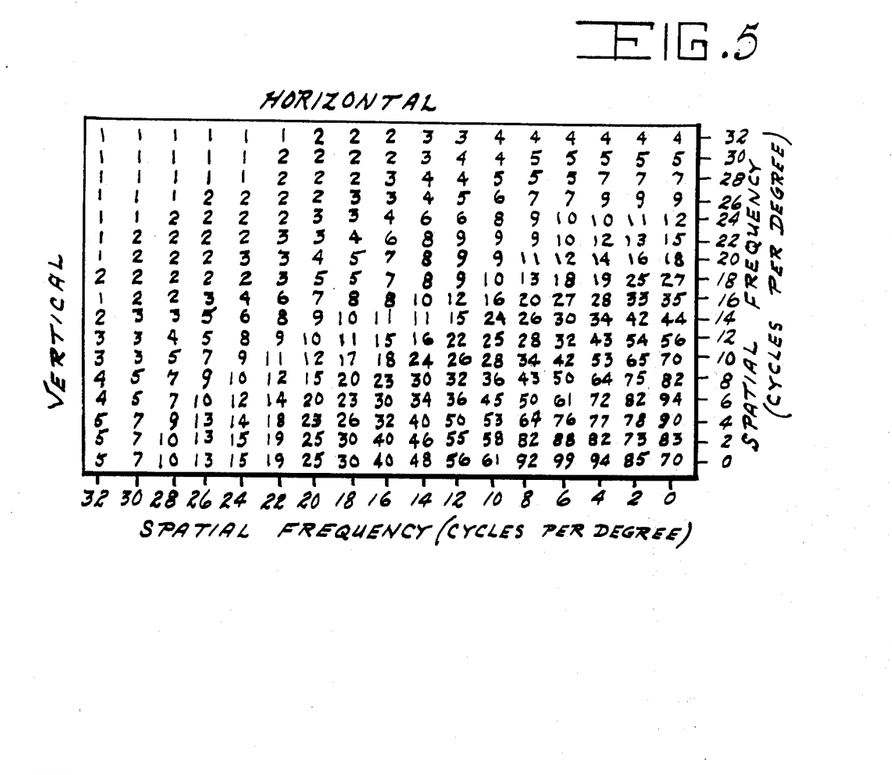
FIG. 5 is a typical modulation transform function set of values for a 64 by 64 array.
Figure 6:
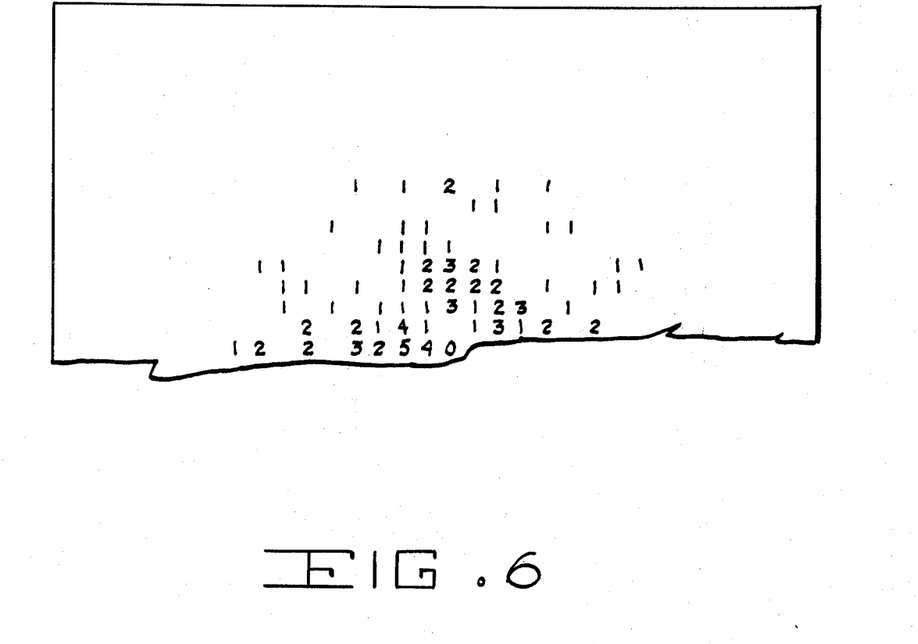
FIG. 6 is a digital representation of the normalized amplitude spectrum of the dotted G represented in the Fourier transform of FIG. 4 after it has been acted on by the MTF filter of FIG. 5.
Figure 7:
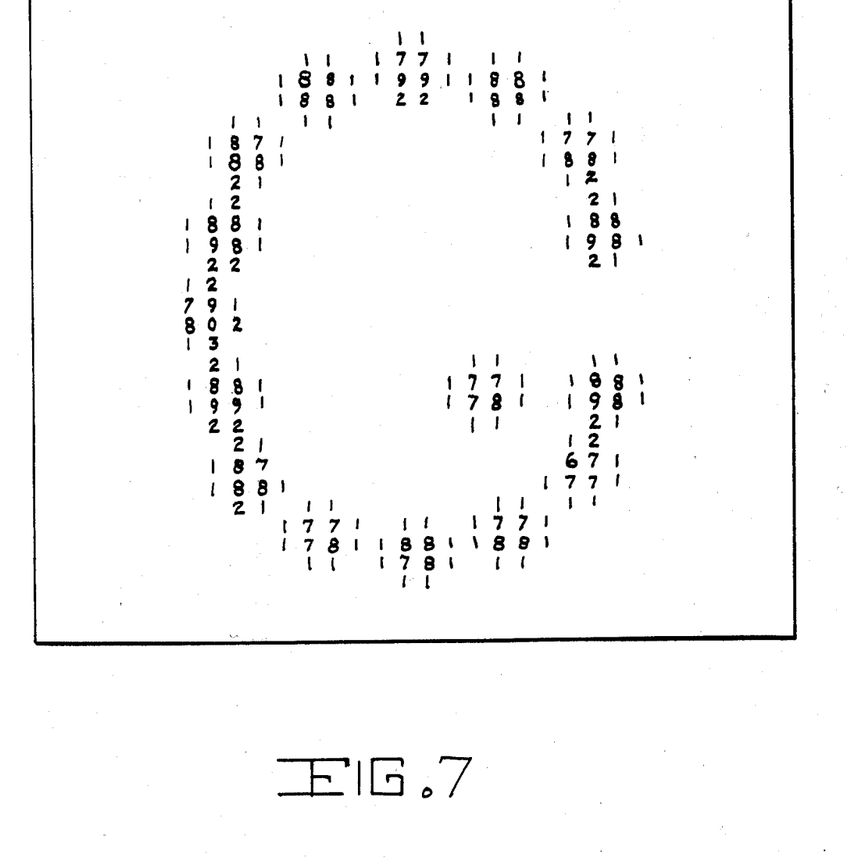
FIG. 7 is the inverse transform of FIG. 6 (with the bottom half presented) in order to illustrate the reconstructed dotted G and the effects of the MTF filter on the original dotted G.
Figure 8:
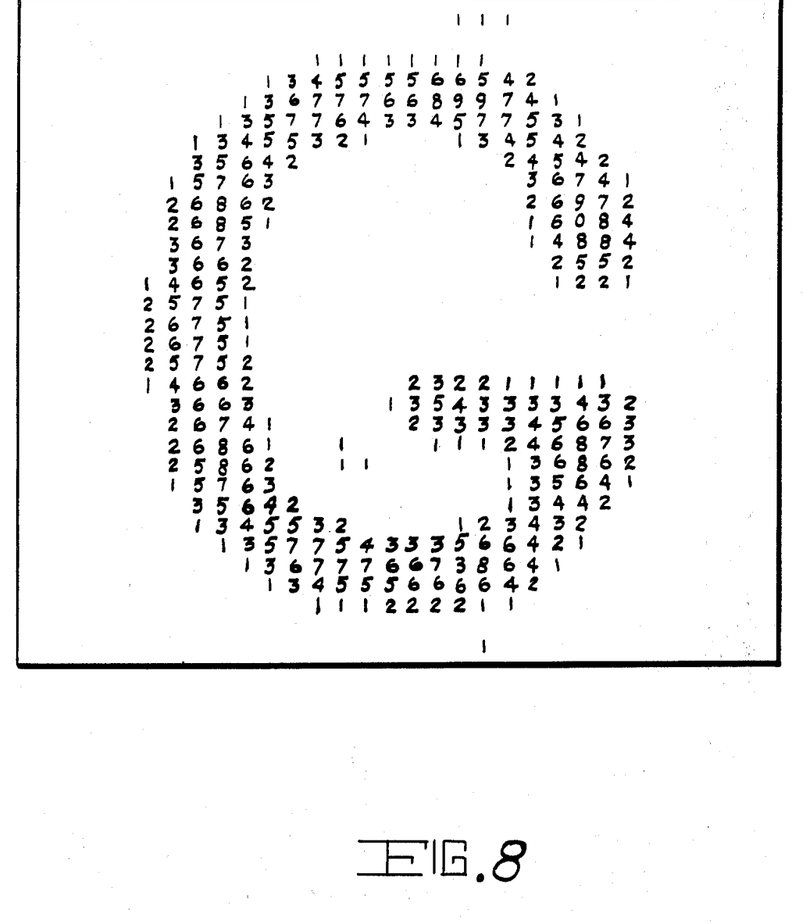
FIG. 8 is a digital representation of the dotted G representation of FIG. 7 after further spatial filtering by conventional low pass spatial filter.

The transform 12, the lower half of which is omitted to avoid duplication since the transform is symmetric, is illustrated in FIG. 3 and provides a digital representation of discrete Fourier amplitude transform values of the pattern of FIG. 2. FIG. 4 is a digital representation of the normalized transform of FIG. 3 also with the lower half removed for simplicity. The MTF spatial filter 14 of FIG. 1, which is always anisotropic and is represented digitally in FIG. 5 for only one quadrant of a 64 by 64 array, since the remaining quadrants can be achieved by appropriate replication in the other three quadrants. It should be noted at this point that the MTF filters can have different values depending upon the data obtained from the human visual system. That which is shown is for high sensitivity at low spatial frequencies. When the two dimensional pattern of FIG. 2 has been transformed and normalized as illustrated in FIGS. 3 and 4 and had the MTF filter of FIG. 5 applied thereto, the resultant of FIG. 6 provides a representation of the attenuated, normalized amplitude spectrum of the dotted G. The reconstructed G pattern by the inverse Fourier transform is illustrated in FIG. 7 which demonstrates the application of the MTF filter on the original G pattern. Note that the dots are still resolved and that the blurring corresponds to what an observer reports when viewing a photograph constructed from that data. Further conventional bandpass spatial filtering which allows only the first four spatial frequencies to be used in reconstruction of the G pattern by a Fourier transform results in FIG. 8 where a general G form inherent in the dotted G form has been extracted.

The dot letter G for which examples were given in FIGS. 2 through 8 was related to the obtaining of general G form information from the two dimensional transform. Edge, texture and depth information may also be obtained from transform data. In order to obtain edge information we would use the pattern 10 of FIG. 1 to which the transform 12 has been obtained, and energy normalized (divide each spatial frequency by the D.C. term). At this point the MTF spatial filter 14 could be utilized to bias the edges according to orientation; however, the output from the transform could be sent directly to a conventional mid to high frequency bandpass spatial filter 16 for unbiased edges according to orientation. This would result in a pattern outline upon reconstruction. When the MTF filter is utilized, its output could go to the conventional spatial filter 16, which is a mid to high frequency bandpass filter, to extract spatial frequencies for correlation with stored spatial frequencies in a memory or classification device 18. This would allow detection and identification based upon edge pattern features. If the mid to high frequency bandpass filter is isotropic it would best provide form edge outline, whereas anisotropic filters are used for edges at desired orientations. Translation of the spatial filters over the transform plane according to energy in frequency orientation subsets may be used in order to obtain edges at one, two or more orientations. When the mid to high frequency bandpass filter is used for reconstruction, the inverse transform is used instead of the correlation as previously defined. The transform, MTF and bandpass filter steps would be the same as previously described, however, the inverse transform as illustrated at 20 of FIG. 1 would provide highlighted edges and would allow the use of a threshold device 22 which would select intensity ranges by values to separate highlighted edge information from other pattern information. The threshold edges may be used for inputs for form or texture processing. If the transform MTF filter is reconstructed by an inverse transform determination and effects and pattern resolution of the human visual system physiological filtering are obtained.

To obtain form we would, as described by the edge information processing, transform the pattern of 10 at 12 and energy normalize it and also use an MTF filter to attenuate the background from the form or skip the MTF step for unattenuated background. Here we would use a low frequency bandpass filter 16 without the fundamental or a few of the lowest frequencies to obtain the basic form information for correlation at 18 with similar stored spatial frequencies in the memory to detect and identify the form. If the filter 16 is isotropic and translated according to the energy in the frequency orientation subsets, three dimensional forms in memory may be correlated to forms in depth. Reconstruction would utilize the low frequency bandpass filter where the image is transformed, spatially filtered by the MTF filter and applied to an inverse transform 20 to reconstruct patterns where the basis for correlation here would be observed from human analysis or threshold techniques that provide a separation of form information from other pattern information to be provided at 22. To determine the effects and pattern resolution of a human visual system physiological filtering one would transform the image after MTF spatial filtering and inverse transform.

Texture analysis is divided into two systems. Where the texture elements diffier in slope, intensity and in size one would apply a transform 12 to the two dimensional pattern 10 and normalize it, apply the MTF filter to form texture clusters and elminate the MTF filter where there is no texture cluster formation desired. A mid high frequency bandpass filter 16 is used to extract spatial frequencies for correlation with the classification system 18. An isotropic filter would be used for texture band whereas an anisotropic spatial filter would be used for texture clusters differing in slope. Reconstruction by an inverse transform at 20 could be achieved when a transform is applied to an image MTF filtered. The inverse transform is used to reconstruct the filter pattern so that texture clusters are formed for human analysis or threshold techniques could be used for separating texture clusters from other pattern information. The cluster forms may be used as inputs for form processing.

When texture elements differ only in slope or shape from other forms here we would transform an applied MTF filter to attenuate texture and form elements that differ in slope and shape or eliminate this step where no pattern segregation exists in terms of slope. The conventional spatial filtering of the mid high frequency range here would extract spatial frequencies for correlation with stored spatial frequencies in a memory for detection and identification. An isotropic spatial filter would be used after the MTF filter whereas an anisotropic spatial filter would be used to extract texture element according to the energy at various orientations. The mid high frequency bandpass filter could have its output applied to the inverse transform for reconstruction when the MTF has been used. The inverse transform allows for observation of texture elements differing in intensity according to slope and shape. However, threshold techniques which isolate texture elements according to slope and shape by intensity variations could be used to segregate these texture elements and provides an input for further processing. Determination of effects of pattern resolution of human visual physiological filtering could be obtained by utilizing the transform 12 spatial filter 14 and inverse transform 20.

Depth information in planes over large window areas uses the transform 12 on the pattern 10 and may optionally use the spatial filter 14 where a low frequency bandpass filter at 16 removes the fundamental frequency for correlation at 18 with stored spatial frequencies in a memory to determine if depth planes are present. Anisotropic filters would be used for oriented depth planes whereas isotropic bandpass filters would provide the usual depth information. If construction via an inverse transform 20 is desired the transform at 12 with or without step 14 would be applied to the inverse transform. The phase terms of the fundamental spatial frequency or higher frequencies are used to phase lock high spatial frequency information over selected depth planes for form isolation. Here we would select high frequencies having the same phase terms as determined by the very low spatial frequencies. Thus, the inverse transform would reconstruct the filter pattern and the depth plane and forms could be observed for human analysis or by utilizing the threshold techniques illustrated in the flow diagram in block 22.

Where the depth information is a function of pattern intensity variations of smaller forms we would apply the transform 12 to the pattern 10 to obtain an energy normalized pattern with or without the MTF filter. A mid to high frequency bandpass filter would be used, isotropic or anisotropic, translated over high energy subsets according to energy contained in the transform domain. Either correlation of the spatial frequency with similar information stored in memory or reconstruction via an inverse transform may be accomplished for detection, identification, or threshold techniques. The spatial filter bandwidths may be generally determined from the half-power of the pattern elements, to be detected, classified or identified, for example, a large form filling a 32 by 32 pattern element window may use a bandpass filter of $f=2$, 4 cycles per picture width to capture its basic form.

The detection, classification and identification of objects is performed in the transform domain by comparing spatial frequency subsets from the input pattern with similar information stored in memory. This comparison may be done by using a matched spatial filter or cross-correlating the input spatial frequencies with stored spatial frequencies.

Matched spatial filtering, used primarily for detecting and locating objects in complex scenes, is usually used for optical processing whereas cross-correlation is usually used in the digital processing. Those terms may be used for either optical or digital processing and are equivalent, except that a matched spatial filter, if followed by an inverse transform, results in an intensity value whose value and position in the reconstructed plane represent the degree of comparison and location of the detected object.

Maximizing cross-correlation is equivalent to minimizing Euclidean distance ($d$) between two spatial frequency subsets.

$$d = \sqrt{\sum_{n=1}^{N} \sum_{m=1}^{M} [Re_p(n,m) - Re_i(n,m)]^2 \quad [Im_p(n,m) - Im_i(n,m)]^2}$$

where $M$ & $N$ are the number of spatial frequencies in the $x$ and $y$ directions, respectively, used for comparison.

$Re_p$ = real part of transform of prototype in memory
$Re_i$ = real part of transform of the input pattern
$Im_p$ = imaginary part of the transform of the prototype in memory
$Im_i$ = imaginary part of the input pattern This Euclidean distance metric may be normalized and its value used to rank order and thus provide a quantitative measure of how similar the input pattern is to the pattern in memory.

These are linear classification schemes. Non-linear classification schemes based on probability distribution or other decision criteria may be used.

The phase lock technique is a unique method for segregating connected objects in simple or complex scenes using the fundamental or low spatial frequencies to determine subcomponents of a whole pattern. For example, the patterns (assume a series of circles divided equally and unequally by a straight line), each contains different fundamental spatial frequency information directly and results in different intensity distribution if inversely transformed from the fundamental spatial frequency terms. (The fundamental spatial frequency term is defined as one whole cycle of the pattern width.) It is desirable to separate whole patterns into subsections, for example, each section of the divided circle. This is accomplished by correlating the fundamental spatial frequency information with the pattern subsections. If a subsection exists from that information, then by selecting all the higher spatial frequency terms containing similar phase as that of the subsection desired, one can obtain those isolated pattern subsections for further analysis.

Figure 9:
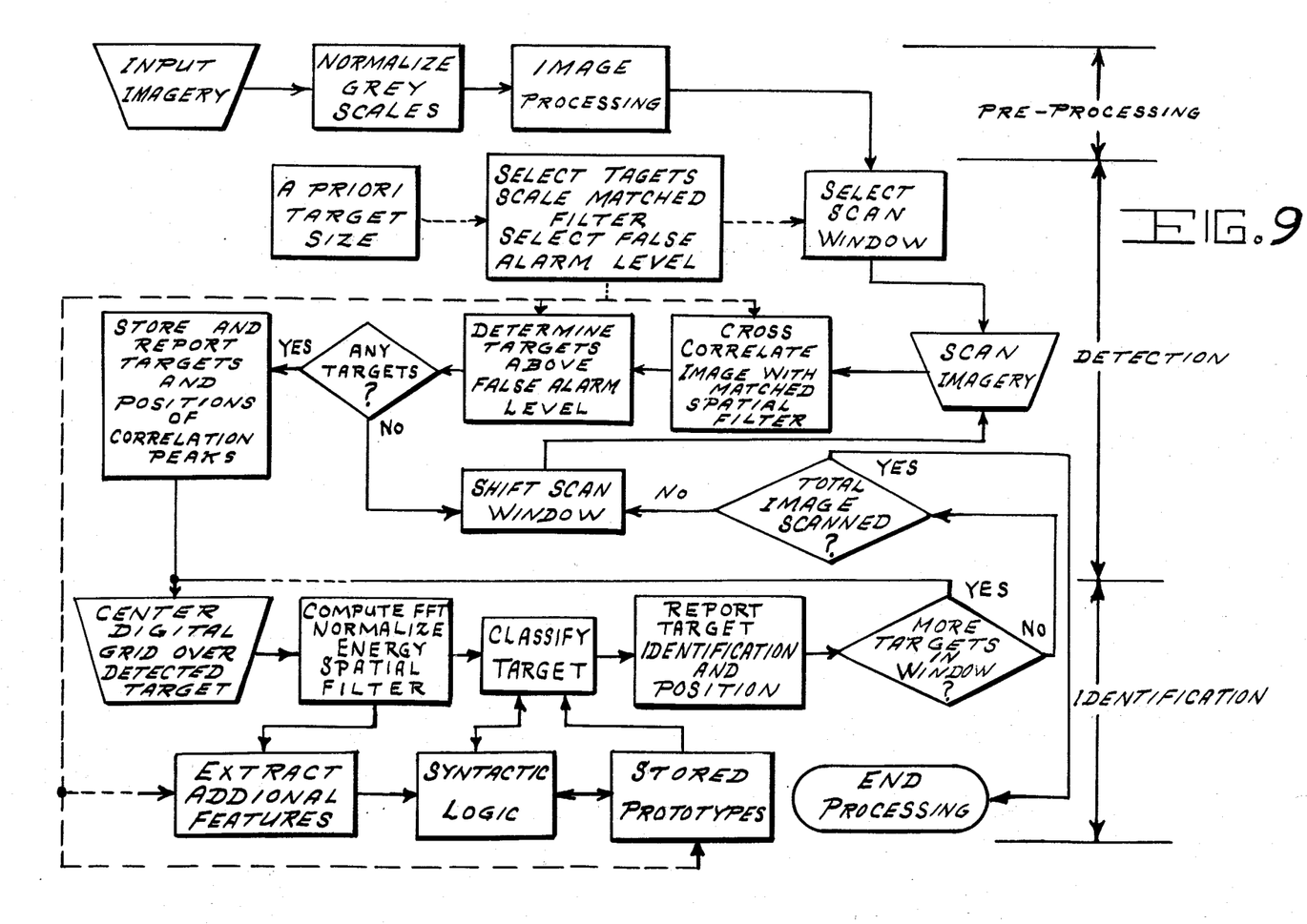
FIG. 9 is a block diagram illustrating target detection and identification techniques.

A basic flow diagram of the information processing techniques proposed to solve the complex scene analysis or target detection and identification problem is presented in FIG. 9. The preprocessing, detection, and identification techniques are discussed in detail. It should be stressed that although the imagery will be initially processed digitally, these techniques, especially the detection stage, may be optimally performed using optical computers.

The preprocessing operations prepare the radar imagery for subsequent target detection and identification techniques. The radar imagery data must be made compatible to the processing systems. Pre-digitized data stored on magnetic tape can be inputted directly. Film imagery will have to be digitized by a scanniny system. Image gray scales will be either linear or log normalized to maintain uniformity of multi-source imagery. The log transform will tend to enhance film contrast lost during original film processing. Further image processing may be desired such as de-convolution of speculars. The preprocessing operations may be accomplished on the entire image data before additional processing is undertaken or performed on each scan window before input to the detection process. Some preprocessing steps could be possibly eliminated if the detection and identification techniques are performed on the image signal in either digital or film form.

The detection techniques are primarily designed to reduce identification processing over image areas that are not of interest. The central concept of the detection technique is to use Priori inputs: desired targets to be detected; approximate target size from radar imaging parameters; and target false alarm levels to set up spatial matched filters for use in a cross-correlator. Thus the detector will be looking only for desired targets that exceed a predetermined target detection error.

A matched spatial filter (MSF) is known to be an optimal filter for separating signals from noise in a linear system. In terms of radar imaging, the unwanted targets and background clutter, i.e., terrain, are the noise to be separated from the desired targets, the signals. The MSF has a transfer function with complex transmittance proportional to the complex conjugate of the Fourier transform of the signal. The MSF converts the complex wavefront of the Fourier transform of the signal into a plane wave which is focused into a bright point in the output plane of the correlator whose position is directly related to the signal position at the input plane. The spatial frequencies from the noise and undesired targets will be attenuated at low valued spatial frequency regions of the MSF, thus reducing the energy of these noise sources detected at the output plane. This concept had been demonstrated usually by detecting highly formatted patterns, e.g., a letter or words repeated on a page of text. However, these demonstrations are really biased and MSF techniques perform poorly when one uses unformatted imagery. The simple reason for the failure is that there is too much noise versus signal energy in most real world scenes. There are two ways that are proposed to greatly reduce that problem. Firstly, the aperture of the input plane of the correlator could be reduced (or the image enlarged) to make the size of the target large compared to the size of the aperture. In other words, scan smaller image areas rather than correlate the entire image at one time. Secondly, previous research has demonstrated that basic shape information lies in a relatively small band of spatial frequencies. Thus a bandpass MSF based upon gross target shape will be generated and spatial frequencies generated by clutter, which are primarily high spatial frequency data, will not be allowed to pass into the output plane and reduce the signal to noise ratio. The size of the scan window will be made as large as possible as to allow for maximum detection areas with lowest tolerable signal to noise ratios. Target size differences will be compensated for by appropriate scaling of the bandpass MSF by extrapolation or interpolation from the radar imaging system scaling parameters. Target rotation in the image space produces a concomitant rotation in the Fourier transform domain. Previous research with rotated simple patterns using Fourier transform techniques demonstrated successful pattern classification under ±30° rotation. Therefore, a solution to this problem is to rotate the MSF 360 degrees in 12 increments of 30 degrees each. Another solution is to create one inclusive "OR" MSF from rotated MSFs to obviate any rotation requirements during detection processing. The bandpass MSF will still detect the basic target shape even though some target degradation will occur due to radar aspect angle changes unless the degradation is such that an observer could not detect the target. Most target degradations due to aspect angle involve relatively higher spatial frequencies. These techniques enable quick, efficient target detection using MSF techniques that have previously failed.

The energy content of the correlation peaks provide a degree of similarity between the detected target and the prototype (MSF) as well as positional information that will be required for the target identification task. Correlation peak energy exceeding a preselected false alarm level will indicate a detected target and will be reporated as such. No targets detected in a scan window will cause the same window to shift and detection processing to be initiated over the new scan window.

The correlation peaks in the output plane of the correlator provide the location of possible targets and lead the identification processing to only those image areas of interest. Thus the more detailed and time consuming processing elements are concentrated only at selected target areas, an important consideration for any possibility of real-time target identification in light of present digital transform processing speeds. The central concept for target identification is the same as that of the detection process except that more shape (feature) information is used in a more controlled decision process guided by the detection results.

A tapered grid is centered over the detected target whose size, approximately 32 × 32 elements, will be a function of the target size. The fast Fourier transform computed over the grid is energy normalized and spatial filtered. The target spectral components comprise the target feature vectors. Additional features that have been previously determined to be required for correct target identification can be extracted from other target spectral components. Furthermore, target context, e.g., background-texture, can be extracted from the higher spectral components. These additional features can be added syntactically (isolated and put into context) to the feature space which will be inputted to the classifier/identifier discriminant. The main discriminant used quite successfully for many diverse pattern classification tasks has been minimum Euclidean distance, equivalent to maximizing correlation, of low spatial frequencies with stored prototypes. Other discriminants may be used. Previous pattern recognition tasks have required at most 7 × 7 or 49 low spatial frequency values to be stored as prototypes, a quite small amount of data when compared to other feature extractor techniques such as template matching. The stored prototypes will be the result of averaged training set targets. It is important to realize that the radar imaging artifacts such as shadowing effects are included in the training sets and will not present any difficulty as long as the shadowing effects are similar for the same target. Since the images are a function of the target geometry, only variations due to radar look angle will present deviations in the image. Thus the technique presented here does not require optical fidelity of the image but shape (low spatial frequency) fidelity of the imaging system. It is emphasized that it is the low spatial frequency target shape information that is used for these detection and identification techniques.

Each detected target will be processed by the preceding techniques and rank ordered against previously selected prototype targets. The closest prototype in a Euclidean distance sense to the target will be identified and reported as such with the normalized discriminant value providing a measure of the degree of similarity between the prototype and the target. It may be desired to use decision trees to eliminate the different classes of prototypes to be classified with any given target. For example, a swept wing aircraft can be identified as such by off axis Fourier spatial frequencies which in turn could exclude non-swept wing aircraft from the classification process. Each detected target in each scan window will be processed as just outlined until the complete image is processed.

Although this invention has been described relative to particular embodiments, it will be understood that the invention is capable of a variety of alternative embodiments. Each of the steps or techniques may be performed optically or electronically. For example, the translation can be optically performed by physical movement or mathematically performed by electronic or symbolic means. All of the elements are well known in the art and are standard with respect to methodology or technique except for the MTF filter, which makes information easier to obtain and use by providing improved sensitivity for thresholding, the utilization of translation for obtaining depth information, and phase comparison with magnitude for complex scene or pattern analysis. The novel combination of method steps and means provides results not heretofore obtained. I intend to be limited only by the spirit and scope of the appended claims.

I claim:

1. Apparatus for analyzing a two dimensional pattern comprising, means for transforming the pattern into a spatial frequency domain to relate harmonically the elements forming the pattern information, means for filtering the transformed pattern substantially in accordance with the anisotropic attenuation characteristics of the human visual system, and means for bandpass filtering the filtered transform to extract spatial frequency subsets from the said filtered transform for feature analysis.

2. An apparatus as defined in claim 1 wherein said feature analysis is obtained by correlation of said spatial filter subsets with stored information or for inverse transform and reconstructing band spatial frequency subsets for further analysis.

3. A static, single stage, two dimensional, anisotropic, spatial frequency magnitude filter having spatial frequency attenuation characteristics corresponding substantially to the average contrast sensitivity of the human physiological visual system resolution at particular ambient light conditions over 360° of viewing angle.

* * * * *